Feb. 18, 1958
A. F. CHAPMAN
2,824,024
THERMOPLASTIC POLYMERIC FILMS
Filed Dec. 9, 1954
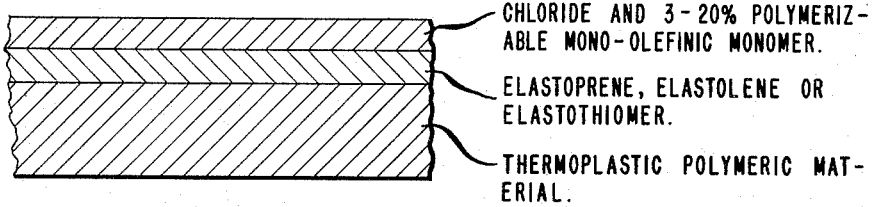
INVENTOR
AURELIUS FRANKLIN CHAPMAN
BY
ATTORNEY

United States Patent Office 2,824,024
Patented Feb. 18, 1958

2,824,024

THERMOPLASTIC POLYMERIC FILMS

Aurelius Franklin Chapman, Wilmington, Del., assignor to E. I. du Pont de Nemours and Company, Wilmington, Del., a corporation of Delaware Application December 9, 1954, Serial No. 474,267

17 Claims. (Cl. 117—76)

This invention relates to the manufacture of thermoplastic polymeric films such as films of polyethylene terephthalate, polyethylene, polystyrene, rubber hydrochloride and polyvinyl chloride. More particularly, it relates to the preparation of polyethylene terephthalate and polyethylene films suitable for conversion to bags, containers and similar packages.

The desired properties for transparent packaging films are well known. They include strength, heat-sealability, durability of the heat-seal as well as durability of the complete film, moistureproofness, low permeability to oxygen and carbon dioxide, high gloss, clarity and freedom from electrostatic charges.

In the case of thermoplastic polymeric materials such as polyethylene terephthalate, strength is obtained by orienting the film in a stretching and/or rolling operation followed by heat-setting the film. Orienting, however, increases the degree of crystallinity and effects other micro-structural changes which tend to impair some of the remaining properties of the film. For example, after orienting polyethylene terephthalate film it is no longer possible to heat-seal the film with most conventional heat-sealing apparatus and obtain durable bonds. Attempting to heat-seal results in severe shrinkage with attendant puckering and weakness at the seal.

On the other hand, thermoplastic materials such as polyethylene do not require orienting to obtain strength. As unoriented films they possess properties which contribute to their successful utilization in a wide variety of packaging applications. However, polyethylene films lack the requisites for some packaging applications particularly vacuum packaging. Limpness (lack of stiffness) and permeability to such gases as oxygen, carbon dioxide, and organic vapors preclude the use of polyethylene films for vacuum packages.

Recognizing the above major obstacles to wider commercial use of thermoplastic polymer films such as polyethylene terephthalate and polyethylene, the industry has proposed various remedies. These remedies take the form of coatings or other treatments which tend to improve one property at the expense of another property. However, a thermoplastic polymeric film possessing the optimum requirements for use in a wide variety of commercial packaging applications has remained an elusive goal.

The object of the present invention is to provide a novel thermoplastic polymeric film fulfilling the requirements of a packaging material, i. e. strength, durability, heat-sealability, moistureproofness, low permeability to gases, etc. Another object is to specify a process for preparing the novel thermoplastic polymeric films, particularly films of polyethylene terephthalate and polyethylene. Other objects will appear hereinafter.

The objects are accomplished by providing a base film of thermoplastic polymeric material having at least one surface coated with two special coatings:

(1) A subcoating comprising an elastomer selected from the group consisting of elastoprene, elastolene and elastothiomer, preferably an elastoprene.

(2) A top coating comprising a copolymer obtained from 80–97% vinylidene chloride and 3–20% of at least one other polymerizable monoolefinic monomer copolymerizable therewith.

Preferably, the subcoating comprises a copolymer obtained from 40–80% butadiene and 20–60% acrylonitrile and the top coating comprises a copolymer obtained from 90–97% vinylidene chloride and 3–10% of an alkyl acrylate. For optimum properties, the top coating should also contain 0.5–3%, based on the weight of vinylidene chloride and alkyl acrylate, of an unsaturated aliphatic acid from the group consisting of acrylic, methacrylic, and itaconic acids.

The accompanying drawing illustrates in a cross-sectional view the novel packaging film of this invention. In the drawing, the base film of thermoplastic polymeric material, the subcoating of an elastoprene, elastolene or elastothiomer, and the top coating of a copolymer of vinylidene chloride and a polymerizable mono-olefinic monomer are identified by legends.

When used in this application, "elastoprene" refers to derivatives of butadiene as defined in H. L. Fisher's article, "Nomenclature of synthetic rubbers," Industrial and Engineering Chemistry, volume 31, page 941 (1939), and includes butadiene rubbers, piperylene rubbers, isoprene rubbers, dimethylbutadiene rubbers and haloprene rubbers. "Elastolene," as defined in the same article by Fisher and as used in the present application, encompasses polymers such as polyisobutylene. "Elastothiomer" encompasses the polyalkylene sulfides.

In a specific embodiment of this invention, a base film of polyethylene terephthalate 0.5 mil thick, stretched three times its original dimensions in two directions and heat-set at 200° C. while under tension, was coated wtih the two special coatings. Both coatings in the form of aqueous dispersions were applied by passing the base film through coating baths. Excess dispersion was doctored from the film surface.

The dispersions used for subcoatings are in general sold commercially, and can be applied directly without modification. The top coatings containing the vinylidene chloride copolymers were prepared by adding "Duponol" WAQ,[1] "Sulframin" AB,[2] ammonium persulfate, itaconic acid and water to a vessel fitted with a reflux condenser. After dissolving these components by stirring, vinylidene chloride and the alkyl acrylate were introduced and the mixture refluxed at 35° C. A solution of meta-sodium bisulfite was added and the mixture stirred until refluxing ceased, thereby indicating the completion of copolymerization. Subsequent to polymerization "Duponol" WAQ or "Sulframin" AB may be added to stabilize the polymer against coagulation.

The subcoating containing a copolymer of approximately 60% butadiene and 40% acrylonitrile by weight, was prepared from the following charge:

"Hycar" 1561 (B. F. Goodrich Chemical Co.) 60%
   butadiene/40% acrylonitrile dispersed in water
   (about 39% solids) _____pounds__ 51
Water _____do____ 29
Ammonium caseinate _____grams__ 136

The top coating containing a copolymer of 92% vinylidene chloride, 8% methyl acrylate and 1%, based on ---
[1] Sodium salt of a fatty alcohol sulfate in aqueous solution (33% active ingredient)
[2] Sodium salt of an alkyl benzene sulfonate.

the total weight of the previous two components, of itaconic acid was prepared from the following charge:

| | |
|---|---|
| Water | 144 pounds. |
| "Duponol" WAQ | 9.5 pounds. |
| Ammonium persulfate | 136 grams. |
| Vinylidene chloride | 132 pounds. |
| Methyl acrylate | 12 pounds. |
| Itaconic acid | 1.4 pounds. |
| Meta-sodium bisulfite | 68 grams in 1.5 lbs. water. |

Added subsequent to polymerization:

"Sulframin" AB _____ 4.3 lbs. in 10 lbs. of water

The polyethylene terephthalate base film (approximately 0.5 mil in thickness) was subcoated by passing the film through a bath of the first dispersion. Contact time was sufficient to allow the base film to retain a slight excess of the subcoating. The excess was removed by doctoring as the coating was made smooth and brought to the desired thickness. The single-coated film was then dried in an atmosphere maintained between 120° C. and 130° C. (It is important that the subcoating is fully coalesced and substantially dry before the top coating is applied.) Then the aqueous dispersion of the top coating was applied, smoothed and dried in a similar manner. The total coating weight was about 18.4 grams/square meter; 10.8 grams/square meter of the subcoating, 7.6 grams/square meter of the top coating.

The resulting film retained the strength, high gloss and clarity of the uncoated base film. The remaining properties are substantially improved as shown in the following table.

TABLE I

| Film | $H_2O-O_2-N_2-CO_2$ Permeability (grams/100 sq. meters/hour) | Heat-Seal Strength (grams/1.5 in.) | Heat-Seal Durability (falls survived)[1] |
|---|---|---|---|
| Uncoated | 350—4.0—2.0—6.7 | 0 | 0 |
| Single-coated | 66 | 635 | 0 $T_{10}$ |
| Double-coated | 31—1.6—1.4—2.1 | 1,000 | 36 $P_{10}$ |

[1] Conditioned at 75° F. and 35% relative humidity.

The durability of the coated film was also measured in this specific embodiment. Bags were fabricated (heat-sealed bags 3" wide x 2" gusset x 11" long), and each bag was filled with 800 grams of rice. Fifteen bags were packed into a cardboard case, the packed case weighing about 28 pounds. The case was dropped from a height of 2' at 0° F. and, after 30 drops all the fifteen bags were intact.

The details of the methods for testing the films follow:

Coating weight is determined by immersing a portion of the film in cyclohexanone at room temperature for 15 minutes or longer if necessary to dissolve the coating entirely; rinsing in ethyl acetate; and drying overnight at room temperature and 35% relative humidity. The sample is weighed before and after this treatment to determine the coating weight.

Moisture permeability is determined by placing the test film over the top of an aluminum cup containing 15 milliliters of water, the test area being 33.3 square centimeters. The assembly is weighed accurately and then placed in a dry (less than 3% relative humidity) air-swept oven at 39.5° C. for 24 hours. The assembly is removed from the oven, cooled to room temperature and reweighed. The weight loss is converted to grams of water lost/100 square meters/hour.

Heat-seal strength is measured by cutting a piece of the coated film 4" x 10" with the grain running in the long direction into two pieces 4" x 5". The two pieces are superimposed so that opposite surfaces are in contact. The two pieces of superimposed film are then sealed together at each end at right angles to the grain. For polyethylene terephthalate, a ¾" wide sealing bar heated to a temperature of 160° C. at 20 p. s. i. pressure contacts the ends for two seconds. (For polyethylene film, the sealing bar is ⅛" wide, at a temperature of 210–230° C. at 10 p. s. i. and a 0.15 second contact time is used.) The sealed sheets are then cut in half at right angles to the grain. From the center of the four resulting pieces, 1½" wide strips parallel to the grain are cut. The four sets of strips are then conditioned for one day at 75° F. and 35% relative humidity. They are tested by opening each set of strips at the free ends, placing them in a Suter testing machine and pulling them apart. The highest force in grams required to pull the strips apart is taken as a measure of the heat-seal bond strength.

Heat-seal durability is measured by an accelerated durability test, the "Rice Bag Drop" test. The rice bags are made by folding a 4" x 15" sheet of the coated film and sealing the film along the two long edges with the bar type heat sealer described previously. After 100 grams of rice are put into the bag, the open end is sealed with the same type of heat sealer. This leaves a small but uniform amount of free space above the rice. The bags represent envelopes of outside dimensions 4" x 6½" and inside dimensions 3" x 5". The bags are conditioned overnight at 75° F. and 35% relative humidity or 5° F. and 35% relative humidity as indicated in the tables. The test consists of releasing the bag from a fixed clamp which is 2 feet above the floor of a porcelain tray. The bags are held by the end seal and allowed to drop onto the non-sealed bottom edge. The number of falls survived before loss of rice occurs from any type of failure, is taken as a measure of durability. The type of failure is indicated by letter; P indicating failure by peeling of the seal, T indicating failure by tearing of the film in the sealed area. Thus 14 $P_9T_1$ means that 10 bags were tested and survived an average of 14 falls. Nine bags failed by peeling of the seal; one bag failed by tearing of the film in the sealed area.

Film durability is evaluated for coated polyethylene film instead of heat-seal durability. The application of polymeric coatings to polyethylene film tends to degrade film durability. On the other hand, the durability of polyethylene terephthalate film is not materially affected by polymeric coatings. The accelerated film durability rating is obtained by folding over a 5" x 12" piece of film and sealing it along two sides with a ¾" strip of a pressure sensitive cellophane tape. This provides a 5" x 6" envelope which is then filled with 400 grams of rice. The envelope is then sealed at the top with the pressure-sensitive tape, leaving a small but uniform amount of free space above the rice. Normally, the longest dimension of the piece of 5" x 12" film runs in the direction in which the film has been extruded. In testing the bag, this length-wise direction of the film is perpendicular to the plane upon which the bag is dropped. The test consists of dropping the bag onto a stone-topped laboratory desk from a fixed height of 18 inches above the desk, i. e., 18 inches from the bottom of the bag to the desk top. The bags are allowed to drop onto the non-sealed (bottom) edge of the bag. The number of falls or drops survived before loss of rice from film failure is recorded; and tests in which loss of rice resulted from failure of the pressure-sensitive tape are invalidated. Generally, five bags are tested for each film candidate, and the average taken.

Gas permeability is measured by sealing the test film between the high and low pressure side of a split permeability cell (the test area being 39 square centimeters). The test gas is passed through the high pressure side while the low pressure side, to which a manometer is attached, is evacuated to a pressure of approximately 3 millimeters of mercury. At this point the low pressure side is sealed off but the flow of the test gas at one atmosphere is continued through the high pressure side. Diffusion of gas through the test film is then graphically recorded by plotting the rate of fall of the manometer as a function of time. Gas laws are applied to the data so obtained and the gas permeability value is expressed in grams/100 square meters/hour.

Tables II and III, which follow, summarize the examples of this invention. Table II presents examples wherein polyethylene terephthalate is the base film; Table III, polyethylene. Examples 1, 2, 13 and 14 are outside the scope of the invention and are presented for comparison.

The films were prepared essentially in the manner described previously. The base film, polyethylene terephthalate or polyethylene, was unwound from a roll, passed over a tensioning roll and under a guide roll into a tank containing the coating composition. The coated film was then passed between two "doctor" rolls to smooth the coating and to regulate its thickness. The coated film was dried in a tower maintained at 120° C.–130° C. in the case of coated polyethylene terephthalate and 80° C.–85° C. for polyethylene. The second or top coating was then applied similarly.

The coating compositions were prepared substantially as described for the specific embodiment. The amounts of polymer components were varied to provide the percentages given in the tables.

Before applying the coating compositions to polyethylene film, the base film was pretreated to improve adhesion of the coating compositions to the film. The treatment, as disclosed in copending application Serial No. 323,271, filed November 29, 1952, to L. E. Wolinski, comprises exposing the freshly formed film to ozone at a temperature above 150° C. immediately after extrusion of the film. It is believed that this treatment roughens the surface of the film. When applying the coating compositions to polyethylene film, care must be taken to avoid stretching or elongating the film.

In the examples, the components used for preparing the copolymers are given in weight percentages. The percentages of itaconic acid in the top coating are based on the total weight of the major components. Thus, a copolymer from 92% vinylidene chloride, 8% methyl acrylate and 1% itaconic acid may be prepared by using 46 pounds of vinylidene chloride, 4 pounds of methyl acrylate and 0.5 pound of itaconic acid.

For convenience, abbreviations and commercial names have been used in the tables. $VCl_2$ represents vinylidene chloride; MA, methyl acrylate; IA, itaconic acid; "Hycar" 1512, butadiene/acrylonitrile copolymer containing about 74% of butadiene based upon the total weight of the two components and made by the B. F. Goodrich Chemical Co.; "Hycar" 1552, butadiene/acrylonitrile copolymer containing about 70% butadiene and made by the B. F. Goodrich Chemical Co.; "Hycar" 1561, butadiene/acrylonitrile copolymer containing 62% butadiene and made by the B. F. Goodrich Chemical Co.; "Hycar" 1577, butadiene/acrylonitrile copolymer-resin mixture containing 73% butadiene and made by the B. F. Goodrich Chemical Co.; "Butaprene" NSP 169, butadiene/acrylonitrile copolymer containing 63% butadiene and made by the Firestone Tire and Rubber Co.; "Chemigum" 245, butadiene/acrylonitrile copolymer containing 69% butadiene and made by the Goodyear Tire and Rubber Co.; "Chemigum" 235, butadiene/acrylonitrile copolymer containing 62% butadiene and made by the Goodyear Tire and Rubber Co.; Neoprene 750, a polymer of 2-chloro-1,3-butadiene made by E. I. du Pont de Nemours & Co.; Dow 546C, a polymer of butadiene and styrene containing about 50% butadiene and made by the Dow Chemical Co.; "Vistanex" B-80, polyisobutylene, made by Enjay Corporation.; "Thiokol" MX, a rubbery polyalkylene sulfide prepared by reacting ethylene dichloride and sodium polysulfide to produce a product having the empirical formula $(C_4H_8S_4)_n$, made by the Thiokol Corp.; g, grams; m, meters; *, less than; , greater than; *, approximately.

TABLE II

*Properties of polyethylene terephthalate films*

| Example | Subcoating | | Top coating | | Total Coating Weight (g./m.²) | $H_2O$—$O_2$—$CO_2$ Permeability (g./100 m.²/hr.) | Heat-Seal Strength (g./1.5 in.) | Heat-Seal Durability (falls survived) | |
|---|---|---|---|---|---|---|---|---|---|
| | Composition | Weight (g./m.²) | Composition | Weight (g./m.²) | | | | 75° F.ᵃ | 5° F.ᵇ |
| 1 | None | | None | | None | 350—4.0—6.7 | 0 | 0 | |
| 2 | None | | 94/6/2—VCl₂/MA/IA | 8.6 | 8.6 | 66 | 635 | 0 T | |
| 3 | "Hycar" 1552 | 10.0 | 94/6/2—VCl₂/MA/IA | 9.0 | 19.0 | 61 | 550 | 12 P₁₀ | 12 P₇T₁ |
| 4 | "Hycar" 1512 | 2.6 | 92/8/1—VCl₂/MA/IA | 5.7 | 8.3 | 43 | 46) | 13 P₁₀ | 6 P₁₀ |
| 5 | "Hycar" 1577 | 6.5 | 92/8/1—VCl₂/MA/IA | 14.7 | 21.2 | 19 | 1100 | 7 P₁₀ | 10 P₁₀ |
| 6 | "Butaprene" NSP 169 | 6.0 | 94/6/2—VCl₂/MA/IA | 11.0 | 17.0 | 28 | 510 | 11 P₇ | 8 P₇ |
| 7 | "Chemigum" 245 | 6.5 | 94/6/2—VCl₂/MA/IA | 7.1 | 13.6 | 59 | 460 | 14 P₉ | 11 P₇T₂ |
| 8 | "Chemigum" 235 | 17.0 | 92/8/1—VCl₂/MA/IA | 4.0 | 21.0 | 71 | 590 | 35 P₁₀ | 14 P₅T₁ |
| 9 | Neoprene 750 | 6.0 | 94/6/2—VCl₂/MA/IA | 18.0 | 24.0 | 14 | 670 | 21 P₅ | 9 P₅ |
| 10 | Dow 546C | 7.0 | 94/6/2—VCl₂/MA/IA | 13.0 | 20.0 | 26 | 950 | 10 P₅ | 8 P₅ |
| 11 | "Vistanex" B-80 | 6.0 | 94/6/2—VCl₂/MA/IA | 11.0 | 17.0 | 28 | 500 | 11 P₇ | 8 P₇ |
| 12 | "Thiokol" MX | 7.0 | 92/8/1—VCl₂/MA/IA | 9.0 | 16.0 | 29 | 525 | 10 P₁₀ | 7 P₁₀ |

ᵃ Conditioned at 75° F.
ᵇ Conditioned at 5° F.

TABLE III

*Properties of polyethylene films*

| Example | Subcoating | | Top coating | | Total Coating Weight (g./m.²) | $H_2O$—$O_2$—$CO_2$ Permeability (g./100 m.²/hr.) | Heat-Seal Strength (g./1.5 in.) | Film Durability Rating |
|---|---|---|---|---|---|---|---|---|
| | Composition | Weight (g./m.²) | Composition | Weight (g./m.²) | | | | |
| 13 | None | | None | | None | 70—12—15 | 1,500 | 50** |
| 14 | None | | 94/6/2—VCl₂/MA/IA | 7.6 | 7.6 | 30—1*—1* | 442 | 2*** |
| 15 | "Hycar" 1512 | 5.5 | 94/6/2—VCl₂/MA/IA | 4.5*** | 10*** | | 338 | 19 |
| 16 | "Hycar" 1561 | 5.5 | 94/6/2—VCl₂/MA/IA | 3.0 | 8.5 | 35—1*—1* | 225 | 50** |
| 17 | "Chemigum" 235 | 8*** | 94/6/2—VCl₂/MA/IA | 2*** | 10*** | 40—1***—1*** | 292 | 50** |
| 18 | "Chemigum" 245 | 4 | 92/8/2—VCl₂/MA/IA | 4 | 8 | 35—1*—1* | 560 | 40 |

EXAMPLE 19

A subcoating containing 92%, by weight, of a chloroprene-acrylonitrile copolymer (containing 80%, by weight, chloroprene and 20% acrylonitrile) and 8% "Staybelite" resin, a hydrogenated wood rosin, was applied from an aqueous dispersion to a two-way stretched, heat-set polyethylene terephthalate base film. The "Staybelite" resin was first dispersed in water by stirring powdered resin in hot water after adding a small quantity of ammonia. The resulting ammonium salt of the hydrogenated wood rosin served to improve adhesion to the base film. The coated film was dried by placing in an oven for 5 minutes at 90–100° C.

A top coating containing a copolymer of 90% vinylidene chloride, 10% methyl acrylate and 1% itaconic acid was then applied in the previously-described manner. The properties of the double-coated film were similar to the properties of the improved films shown in Table II.

EXAMPLE 20

A subcoating containing 92%, by weight, of a chloroprene-isoprene copolymer (containing 60%, by weight, of chloroprene and 40% isoprene) and 8% "Staybelite" resin, a hydrogenated wood rosin, was applied from an aqueous dispersion to a two-way stretched, heat-set polyethylene terephthalate base film. The coated film was dried by placing in an oven for 5 minutes at 90–100° C.

A top coating containing a copolymer of 90% vinylidene chloride, 10% methyl acrylate and 1% itaconic acid was then applied in the previously-described manner. The properties of the double-coated film were similar to the properties of the improved films shown in Table II.

While the examples refer to coating polyethylene terephthalate and polyethylene films, the invention is applicable to thermoplastic polymeric films in general. The invention is applicable to these films whether the films are stretched and heat-set, stretched only or neither stretched nor heat-set.

A particularly useful application of the invention is found in using polyethylene terephthalate which has been stretched and/or rolled but not heat-set. This twice-coated polyethylene terephthalate film stretched three times its original dimensions in two directions, is outstanding as a heat-shrinkable tight wrapping for such articles as frozen poultry, ham, smoked meats, etc. The coated heat-shrinkable film is normally formed into a bag open at one end; the article of food is placed into the bag; and the bag is sealed. Air may be evacuated from the bag before sealing if desired. The bag containing the article of food is then immersed in a hot liquid, e. g., water at 70°–100° C., to shrink the bag around the article.

The coatings may also be applied to unstretched films which may then be stretched in one or two directions (as described in U. S. Patent 2,627,088 to Alles and Saner). This procedure also produces a coated, heat-shrinkable wrapping film which may be used directly in sheet form or fabricated into bags.

The important concept leading to the wrapping materials described in the examples and the materials described in the preceding paragraphs resides in the use of a base film of thermoplastic polymeric material coated with two critical coatings, namely; a subcoating comprising an elastomer selected from the group consisting of elastoprene, elastolene and elastothiomer, preferably an elastoprene, and a top coating comprising a copolymer obtained from 80–97% vinylidene chloride and 3–20% of at least one other polymerizable mono-olefinic monomer copolymerizable with vinylidene chloride.

The moisture impermeability of the film of this invention is contributed by the top coating composition. A hard polymer prepared from at least 80% vinylidene chloride and 3–20% of at least one other polymerizable mono-olefinic monomer is necessary. As polymerizable monomers for use with the vinylidene chloride in the top coating, I have illustrated the use of methyl acrylate. However, the invention is not thus limited. Other polymerizable monomers may also be used. The list includes: methyl, ethyl, isobutyl, butyl, octyl and 2-ethylhexyl acrylates and methacrylates; phenyl methacrylate, cyclohexyl methacrylate, p-cyclohexylphenyl methacrylate, methoxyethyl methacrylate, chloroethyl methacrylate, 2-nitro-2-methypropyl methacrylate, and the corresponding esters of acrylic acid; methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, acrylamide, methacrylamide or monoalkyl substitution products thereof, phenyl vinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride, allyl glycidyl ether and other unsaturated aliphatic ethers described in U. S. Patent 2,160,943. These compounds may be described as vinyl or vinylidene compounds having a single $CH_2=C<$ group. The most useful ones fall within the general formula

where R may be hydrogen, a halogen or a saturated aliphatic radical and X is selected from one of the following groups:

—Cl, —Br, —F, —CN, —C$_6$H$_5$, —COOH,

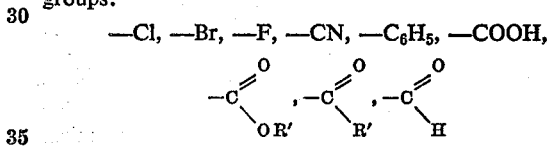

—OC$_6$H$_5$, —CONH$_2$, —CONH—R', and —CONR'$_2$, in which R' is alkyl.

The coatings may be applied from aqueous or organic vehicles, i. e., in the form of aqueous dispersions or from solutions of the polymers in organic solvents. For optimum properties, unsaturated aliphatic acids such as itaconic acid, acrylic acid and methacrylic acid may be incorporated in the top coating compositions. While the examples illustrate the use of itaconic acid in the top coating compositions, substantially equivalent quantities of either acrylic acid or methacrylic acid used in place of itaconic acid produce similar results. When the top coating compositions are applied from organic solutions, the acid may be omitted with little deleterious effect. When coating from aqueous dispersions, the acid may also be omitted if steps are taken to facilitate wetting the film by using commercial wetting agents or other methods. It should be pointed out that films top coated with compositions that do not include the unsaturated aliphatic acids are somewhat inferior in the degree of transparency. For this reason, it is preferred to include one of the above unsaturated aliphatic acids in the top coating compositions.

The coatings may be applied in accordance with any known coating techniques. They may be applied by passing the film through baths in a continuous manner or in a batch manner. Coatings may also be sprayed on the film, or applied manually by brushing or the like. The thickness of the coatings may be adjusted in accordance with methods well known in the coating art. Selection of the proper thicknesses of the top coating and the subcoating depends to some extent on the properties that one desires to emphasize. Thus, the thickness of the subcoating influences the strength and durability of the heat-seal and the durability of the film in general. The thickness of the top coating influences the permeability of the film to moisture and gases.

The double-coated films of this invention are useful as packaging materials for foods, cigarettes and the like. Their durability and their impermeability to gases and water vapor combine to provide wrapping materials that can withstand the abuse of handling and shipping and wherein the freshness of the products may be retained over long periods. A particularly useful application of the improved double-coated polyethylene terephthalate film is in refrigerating units. Polyethylene terephthalate film, being impervious to halogen-substituted hydrocarbon gases such as dichlorodifluoromethane, can be used in the units wherever insulation from these gases is necessary.

While the invention contemplates the use of the copolymers as the essential constituents of the coatings, other ingredients may be added. The addition of pigments, dyes, delustrants, plasticizers, etc., is therefore understood to be within the purview of this invention.

As many widely different embodiments may be made without departing from the spirit and scope of this invention, it is understood that the invention is not limited except as defined in the appended claims.

What is claimed is:

1. A packaging film comprising a base film of thermoplastic polymeric material having at least one surface coated with a subcoating comprising an elastomer selected from the group consisting of elastoprene, elastolene and elastothiomer, and a top coating comprising a copolymer obtained from 80–97% vinylidene chloride and 3–20% of at least one other polymerizable mono-olefinic monomer copolymerizable therewith.

2. A packaging film comprising a base film of thermoplastic polymeric material having at least one surface coated with a subcoating comprising an elastoprene and a top coating comprising a copolymer obtained from 80–79% vinylidene chloride and 3–20% of at least one other polymerizable mono-olefinic monomer copolymerizable therewith.

3. A packaging film comprising a base film of thermoplastic polymeric material having at least one surface coated with a subcoating comprising a copolymer obtained from 40–80% butadiene and 20–60% of at least one other polymerizable compound from the group consisting of acrylonitrile and styrene and a top coating comprising a copolymer obtained from 80–97% vinylidene chloride and 3–20% alkyl acrylate.

4. A packaging film comprising a film as in claim 3 wherein the alkyl acrylate in the top coating is methyl acrylate.

5. A packaging film comprising a base film of thermoplastic polymeric material having at least one surface coated with a subcoating comprising a copolymer obtained from 40–80% butadiene and 20–60% of at least one other polymerizable compound from the group consisting of acrylonitrile and styrene and a top coating comprising a copolymer obtained from 80–97% vinylidene chloride and 3–20% alkyl acrylate and 0.5–3%, based on the total weight of the previous components, of an unsaturated aliphatic acid from the group consisting of itaconic acid, acrylic acid and methacrylic acid.

6. A packaging film comprising a film as in claim 5 wherein the unsaturated aliphatic acid in the top coating is itaconic acid.

7. A packaging film comprising a base film of polyethylene terephthalate having at least one surface coated with a subcoating comprising a copolymer obtained from 40–80% butadiene and 20–60% of at least one other polymerizable compound from the group consisting of acrylonitrile and styrene and a top coating comprising a copolymer obtained from 80–97% vinylidene chloride, 3–20% alkyl acrylate and 0.5–3%, based on the total weight of the previous components, of an unsaturated aliphatic acid from the group consisting of itaconic acid, acrylic acid and methacrylic acid.

8. A packing film comprising a base film of polyethylene having at least one surface coated with a subcoating comprising a copolymer obtained from 40–80% butadiene and 20–60% of at least one other polymerizable compound from the group consisting of acrylonitrile and styrene and a top coating comprising a copolymer obtained from 80–97% vinylidene chloride, 3–20% alkyl acrylate and 0.5–3%, based on the total weight of the previous components, of an unsaturated aliphatic acid from the group consisting of itaconic acid, acrylic acid and methacrylic acid.

9. A packaging process for preparing a film which comprises coating a base film of thermoplastic polymeric material with an elastomer selected from the group consisting of elastoprene, elastolene and elastothiomer; drying the coated base film; applying to the dried coated film a second coating comprising a copolymer obtained from 80–97% vinylidene chloride and 3–20% of at least one other polymerizable mono-olefinic monomer copolymerizable therewith; and drying the twice-coated film.

10. A packaging process for preparing a film which comprises coating a base film of thermoplastic polymeric material with an elastoprene; drying the coated base film; applying to the dried coated film a second coating comprising a copolymer obtained from 80–97% vinylidene chloride and 3–20% of at least one other polymerizable mono-olefinic monomer copolymerizable therewith; and drying the twice-coated film.

11. A packaging process for preparing a film which comprises coating a base film of thermoplastic polymeric material with a copolymer obtained from 40–80% butadiene and 20–60% of at least one other polymerizable compound from the group consisting of acrylonitrile and styrene; drying the coated base film; applying to the dried coated film a second coating comprising a copolymer obtained from 80–97% vinylidene chloride and 3–20% alkyl acrylate; and drying the twice-coated film.

12. A packaging process for preparing a film as in claim 11 wherein the alkyl acrylate in the second coating is methyl acrylate.

13. A packaging process for preparing a film which comprises coating a base film of thermoplastic polymeric material with a copolymer obtained from 40–80% butadiene and 20–60% of at least one other polymerizable compound from the group consisting of acrylonitrile and styrene; drying the coated base film; applying to the dried coated film a second coating comprising a copolymer obtained from 80–97% vinylidene chloride and 3–20% alkyl acrylate and 0.5–3%, based on the total weight of the previous components, of an unsaturated aliphatic acid from the group consisting of itaconic acid, acrylic acid and methacrylic acid; and drying the twice-coated film.

14. A packaging process for preparing a film as in claim 13 wherein the unsaturated aliphatic acid in the second coating is itaconic acid.

15. A packaging process for preparing a film which comprises coating a base film of polyethylene terephthalate with a copolymer obtained from 40–80% butadiene and 20–60% of at least one other polymerizable compound from the group consisting of acrylonitrile and styrene; drying the coated base film; applying to the dried coated film a second coating comprising a copolymer obtained from 80–97% vinylidene chloride, 3–20% alkyl acrylate and 0.5–3%, based on the total weight of the previous components, of an unsaturated aliphatic acid from the group consisting of itaconic acid, acrylic acid and methacrylic acid; and drying the twice-coated film.

16. A packaging process for preparing a film which comprises coating a base film of polyethylene with a copolymer obtained from 40–80% butadiene and 20–60% of at least one other polymerizable compound from the group consisting of acrylonitrile and styrene; drying the coated base film; applying to the dried coated film a second coating comprising a copolymer obtained from 80–97% vinylidene chloride, 3–20% alkyl acrylate and 0.5–3%, based on the total weight of the previous components, of an unsaturated aliphatic acid from the group consisting of itaconic acid, acrylic acid and methacrylic acid; and drying the twice-coated film.

17. A packaging process for preparing a film which comprises coating oriented polyethylene terephthalate film with a copolymer obtained from 40–80% butadiene and 20–60% acrylonitrile; drying the coated film; applying to the dried coated film a second coating comprising a copolymer obtained from 92% vinylidene chloride, 8% methyl acrylate and 1%, based on the weight of vinylidene chloride and methyl acrylate, of itaconic acid; and drying the twice-coated film.

References Cited in the file of this patent

UNITED STATES PATENTS

| | | |
|---|---|---|
| 2,556,885 | Ness | June 12, 1951 |
| 2,627,088 | Alles et al. | Feb. 3, 1953 |

FOREIGN PATENTS

| | | |
|---|---|---|
| 500,178 | Canada | Feb. 23, 1954 |

UNITED STATES PATENT OFFICE

CERTIFICATE OF CORRECTION

Patent No. 2,824,024  February 18, 1958

Aurelius Franklin Chapman

It is hereby certified that error appears in the printed specification of the above numbered patent requiring correction and that the said Letters Patent should read as corrected below.

Column 1, line 52, for "polymer films" read -- polymeric films --; column 2, line 5, for "monoolefinic" read -- mono-olefinic --; line 37, for "wtih" read -- with --; column 9, line 32, for "80-79%" read -- 80-97% --; line 70, for "packing" read -- packaging --; column 10, lines 6, 15, 23, 32, 35, 47, 50, 62, and 74, claims 9 to 17 inclusive, for "A packaging process for preparing a film", each occurrence, read -- A process for preparing a packaging film --.

Signed and sealed this 27th day of May 1958.

(SEAL)
Attest:
KARL H. AXLINE
Attesting Officer

ROBERT C. WATSON
Commissioner of Patents